United States Patent
Sasaki et al.

[11] Patent Number: 5,181,178
[45] Date of Patent: Jan. 19, 1993

[54] SPINDLE CONTROL COMMAND METHOD

[75] Inventors: Takao Sasaki, Hachioji; Kentaro Fujibayashi, Musashino; Masahiko Miyake, Minamitsuru, all of Japan

[73] Assignee: Fanuc Ltd., Minamitsuru, Japan

[21] Appl. No.: 582,204

[22] PCT Filed: Feb. 1, 1990

[86] PCT No.: PCT/JP90/00130
  § 371 Date: Oct. 1, 1990
  § 102(e) Date: Oct. 1, 1990

[87] PCT Pub. No.: WO90/10261
  PCT Pub. Date: Jul. 9, 1990

[30] Foreign Application Priority Data
  Feb. 22, 1989 [JP] Japan ................................. 1-42427

[51] Int. Cl.⁵ .......................................... G06F 15/46
[52] U.S. Cl. .......................... 364/474.11; 364/474.02; 364/474.14; 318/625
[58] Field of Search ............. 364/474.11, 191, 192, 364/474.01, 474.02, 474.14; 82/118; 318/625

[56] References Cited
U.S. PATENT DOCUMENTS

| | | | |
|---|---|---|---|
| 4,683,786 | 8/1987 | Kersten et al. | 364/474.14 |
| 4,862,380 | 8/1989 | Kawamura et al. | 364/474.11 |
| 4,878,172 | 10/1989 | Matsumura | 364/191 |
| 5,037,252 | 8/1991 | Hasegawa et al. | 364/474.11 |
| 5,047,702 | 9/1991 | Hanaki et al. | 318/625 |
| 5,058,029 | 10/1991 | Uemura | 364/474.11 |
| 5,083,071 | 1/1992 | Sasaki et al. | 364/474.23 |

Primary Examiner—Jerry Smith
Assistant Examiner—Paul Gordon
Attorney, Agent, or Firm—Staas & Halsey

[57] ABSTRACT

A spindle control command method is provided for controlling a plurality of spindless by a single numerical control device (CNC), and switching between individual control and synchronous control of a plurality of spindles (1, 3) is effected by a program command (9). Namely, whether the spindles (1, 3) should be controlled individually or synchronously is commanded by an NC program (9), and the CNC carries out switching to the individual spindle control or to the synchronous spindle control in accordance with the command given.

1 Claim, 3 Drawing Sheets

SPINDLE CONTROL COMMAND METHOD

BACKGROUND OF THE INVENTION

1. Field of the Invention

This invention relates to a spindle control command method, and more particularly, to a spindle control command method in which a control of a plurality of spindles is switched by a program command.

2. Description of the Related Art

To carry out machining of workpieces at a high speed, CNC lathes with a plurality of spindles are widely used. In these CNC lathes, opposed spindles may be used to individually machine respective workpieces, or when a long workpiece is to be machined, may be used to cooperatively rotate the workpiece.

Accordingly, it is necessary to provide rotation commands for controlling the two spindles independently as well as those for controlling the spindles as a unit, and to this end, the rotation commands supplied to spindle control circuits are switched by hardware. This switching, however, requires a circuit having a complicated structure and entails an increase in the number of parts required.

SUMMARY OF THE INVENTION

This invention was created in view of the above-described circumstances, and an object thereof is to provide a spindle control command method in which control of a plurality of spindles is switched by a program command.

To achieve the above object, according to this invention, there is provided a spindle control command method of controlling a plurality of spindles by a single numerical control device (CNC), characterized in that switching between individual control and synchronous control of the spindles is effected by a program command.

Namely, whether a plurality of spindles should be controlled individually or synchronously is commanded by an NC program, and in accordance with the command, the CNC device effects switching to the individual spindle control or to the synchronous spindle control.

DETAILED DESCRIPTION OF THE PREFERRED EMBODIMENT

An embodiment of this invention will be described with reference to the drawings.

Figure 1:
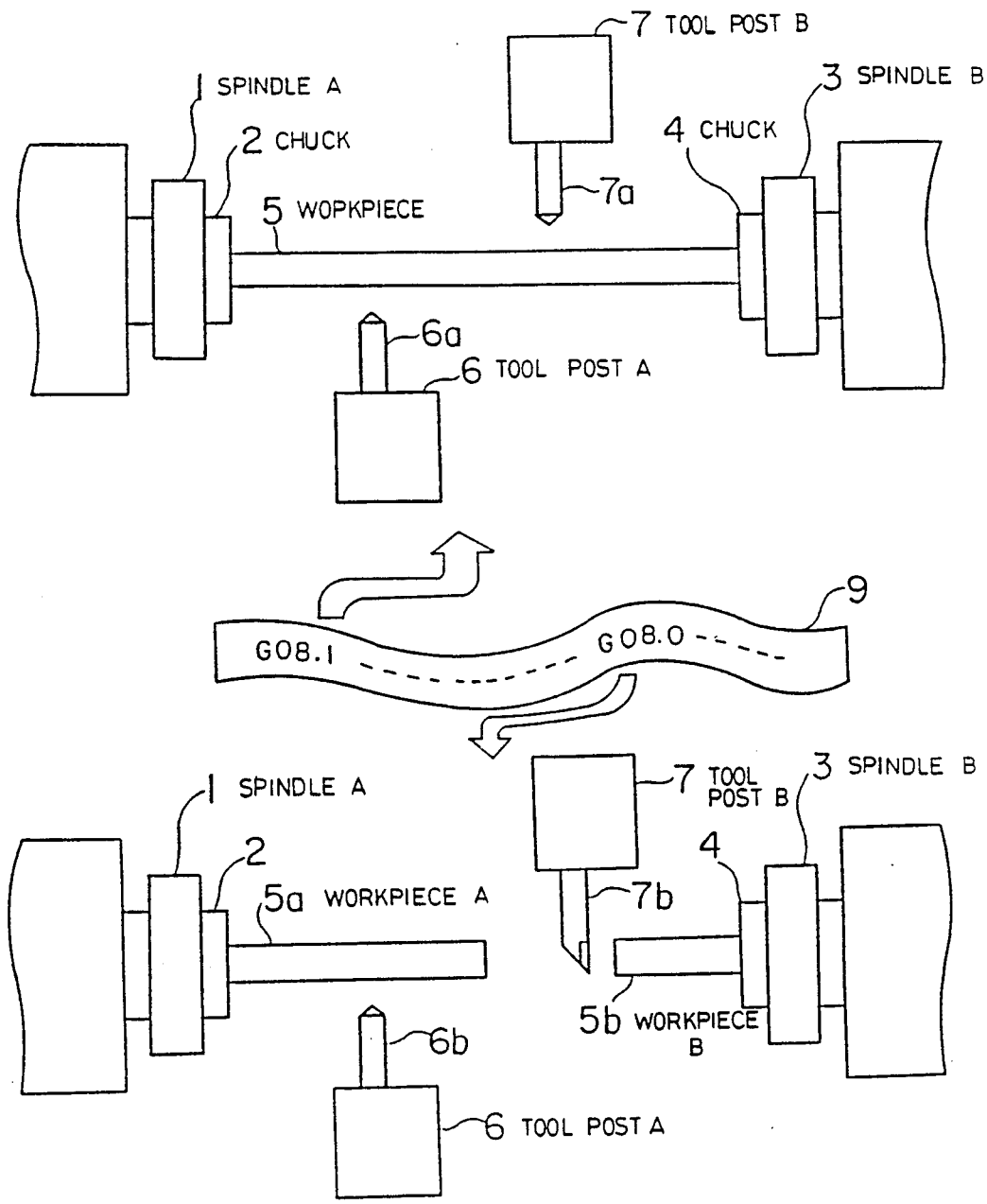
FIG. 1 is a conceptual diagram illustrating a spindle control command method according to this invention.

FIG. 1 illustrates the concept of a spindle control command method according to this invention, wherein a long workpiece 5 is held by a chuck 2 of a spindle A 1 and by a chuck 4 of a spindle B 3, and a turning operation is effected by a tool 6a of a tool post A 6 or by a tool 7a of a tool post B 7. In this case, the spindles A 1 and B 3 must be rotated synchronously, and accordingly, an identical rotation command is given to each.

The lower part of FIG. 1 illustrates a case wherein the spindles are used for machining different workpieces. Here, a workpiece A 5a is held by the chuck 2 and a turning operation is effected by the tool 6b, and a workpiece B 5b is held by the chuck 4 and a turning operation is effected by the tool 7b.

The spindle controls described above are switched by commands "G08.1" and "G08.0" in an NC program 9 on an NC tape. Namely, when "G08.1" is commanded a synchronous control of the spindles A 1 and B 3 is carried out, and when "G08.0" is commanded the spindles A 1 and B 3 are controlled independently and the number of rotations thereof are separately determined.

Figure 2:
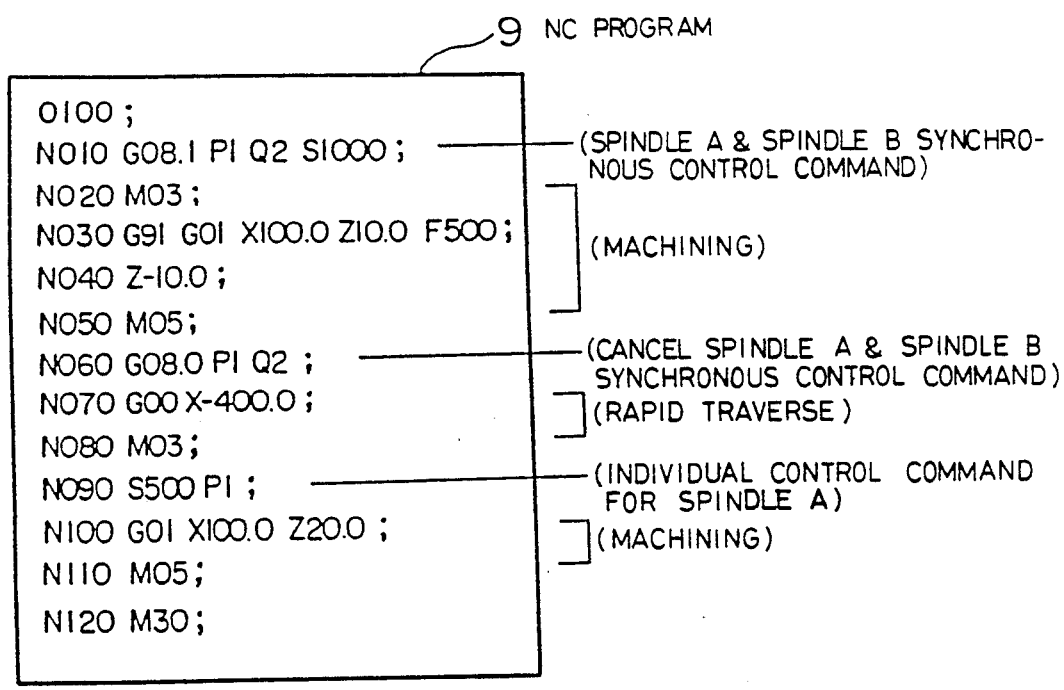
FIG. 2 is a diagram showing an example of an NC program according to this invention.

FIG. 2 shows an example of an NC program according to this invention. As shown in the Figure, an instruction at sequence number N010 in the NC program 9 includes a command for synchronous control of the spindles A and B, corresponding to the case of machining a long workpiece as shown in FIG. 1. Specifically, "G08.1" is the synchronous control command, "P1" indicates the spindle A, and "Q2" indicates the spindle B, whereby the spindles A and B are controlled synchronously. "S1000" is a rotation command for the spindles.

An instruction at sequence number N060 includes a command to cancel the synchronous control of the spindles A and B, and accordingly, a turning operation can be performed on different workpieces by the spindles A and B as shown in FIG. 1.

At sequence number N090 a rotation command is given for the spindle A alone. Note, "M03" is a spindle forward rotation command, and "M05" is a spindle stop command.

Figure 3:
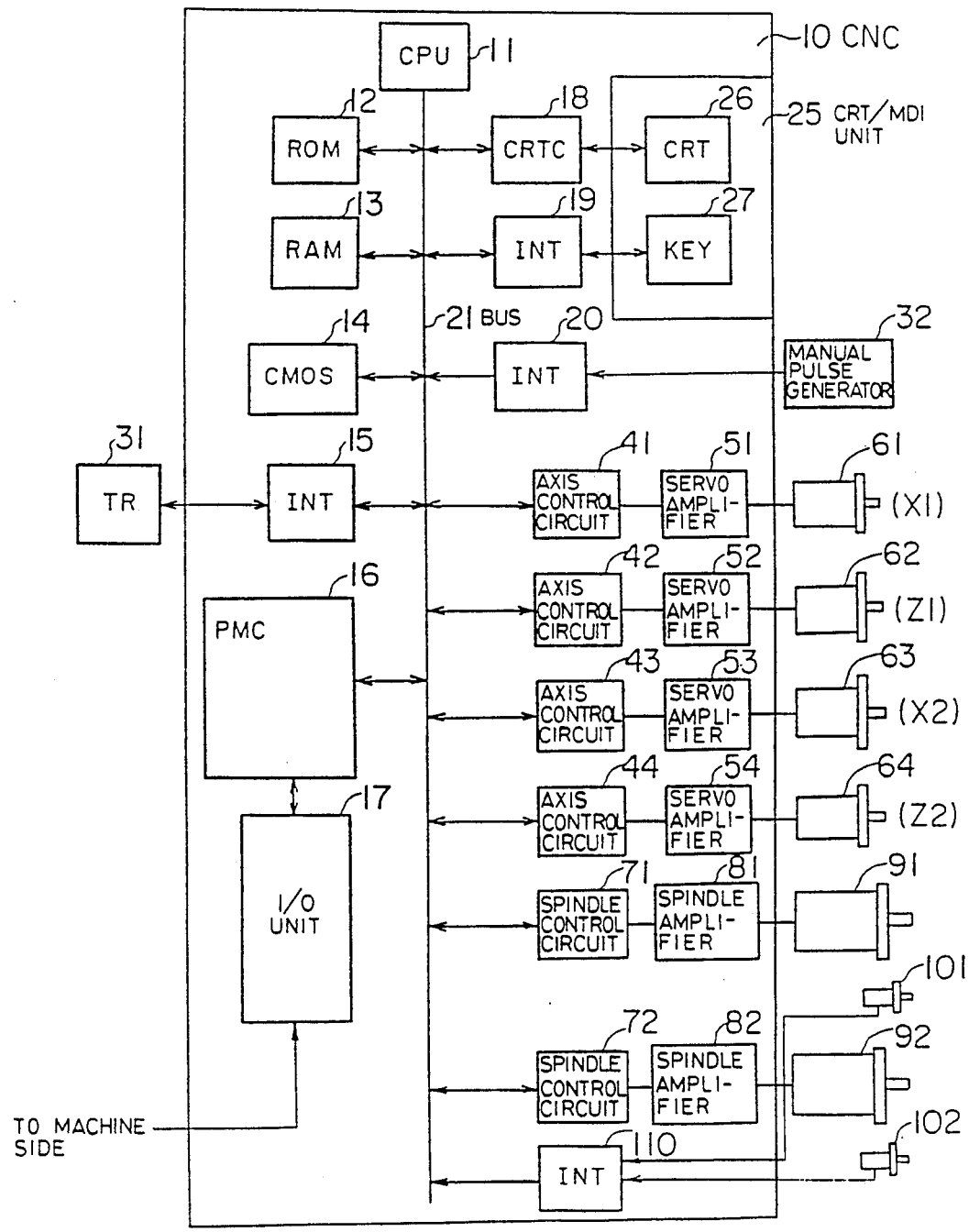
FIG. 3 is a block diagram showing hardware of a numerical control device (CNC) for carrying out this invention.

FIG. 3 is a block diagram showing hardware of a numerical control device (CNC) for carrying out this invention. In the figure, numeral 10 denotes a numerical control device (CNC) wherein a processor 11 for globally controlling the numerical control device (CNC) 10 reads a system program stored in a ROM 12, via a bus 21, and controls the whole of the numerical control system (CNC) in accordance with the system program. A RAM 13 temporarily stores calculation data and display data, etc., and comprises a DRAM, and a CMOS 14 stores tool offset values, pitch error compensation values, an NC program, and parameters, etc., and comprises a nonvolatile memory backed up by a battery, not shown, whereby the data therein is retained even if the power supplied to the numerical control device (CNC) 10 is cut off.

External devices 31, such as a paper tape reader, paper tape puncher, paper tape reader/puncher, etc., are connected to an interface 15. An NC program is read by the paper tape reader, and a machining program edited in the numerical control device (CNC) 10 can be output to the paper tape puncher.

A PMC (programmable machine controller) 16 is incorporated in the CNC 10 and controls the machine side in accordance with a sequence program created in a ladder format. Specifically, the PMC converts M, S and T functions, commanded by the machining program, into necessary signals in accordance with the sequence program, and outputs the signals to the machine side through an I/O unit 17. The output signals drive magnets etc., of the machine, to thereby operate hydraulic valves, pneumatic valves, and electric actuators, etc. Further, the PMC receives signals from limit switches of the machine and from switches of a machine operator panel, and supplies the signals to the processor 11 after effecting a necessary processing thereof.

A graphic control circuit 18 converts digital data, such as current positions of individual axes, alarms, parameters, and image data, etc., into image signals, and outputs the resultant data. The image signals are supplied to and are displayed by a display device 26 of a CRT/MDI unit 25. An interface 19 serves to transfer data input through a keyboard 27 of the CRT/MDI unit 25 to the processor 11.

An interface 20 is connected to a manual pulse generator 32, for receiving pulses therefrom. The manual pulse generator 32 is packaged in the machine operator panel, to permit manual minute movements of machine operating parts.

Axis control circuits 41 to 44 receive respective movement commands from the processor 11 and output the commands to servo amplifiers 51 to 54, respectively. Upon receiving the movement commands, the servo amplifiers 51 to 54 drive servomotors 61 to 64, respectively. A pulse coder for position detection is incorporated in each of the servomotors 61 to 64, and a position signal is fed back therefrom in the form of a pulse train. If necessary, a linear scale may be used as a position detector, and the pulse train may be subjected to F/V (frequency/velocity) conversion to generate a velocity signal. Further, a tachometer generator may be used for velocity detection. Note, the feedback lines of the position signals and the velocity feedback are omitted from the figure. The servomotors 61 and 62 control the tool post A, and the servomotors 63 and 64 control the tool post B, and spindle control circuits 71 and 72 receive commands, such as a spindle rotation command, and spindle orientation command, etc., and output spindle velocity signals to spindle amplifiers 81 and 82, respectively. Upon receiving the spindle velocity signals, the spindle amplifiers rotate spindle motors 91 and 92 at respective commanded rotation speeds. The spindle motors 91 and 92 are connected to the spindles A and B, respectively, via a gear or belt.

Position coders 101 and 102 are connected respectively to the spindle motors 91 and 92 by a gear or belt, and thus are rotated synchronously with the spindles A and B and output feedback pulses which are supplied to the processor 11 through an interface 110, and are read by the processor. The feedback pulses are used for moving the tool post A or B synchronously with the spindle motor, to thereby effect machining, such as thread cutting.

In the foregoing, two spindles are mentioned with reference to the synchronous control and individual control, but it is possible to control three or more spindles synchronously and individually.

As described above, according to this invention, switching between the synchronous control and individual control of the spindles can be commanded by the NC program, and accordingly, switching to synchronous control or individual control can be easily effected.

We claim:

1. A spindle control command method for controlling a plurality of spindles using a single numerical control device (CNC) comprising the steps of:
    (a) commanding synchronous control for a plurality of spindles by using a G code and designate-codes which designate a plurality of spindles controlled synchronously;
    (b) commanding a start of spindle rotation by using an M-code;
    (c) machining a first workpiece having a first length;
    (d) cancelling the synchronous control for the plurality of spindles;
    (e) commanding spindle speeds for the plurality of spindles, respectively; and
    (f) machining a plurality of second workpieces based on respective spindle speeds, said second workpieces having lengths which are shorter than the first length.

* * * * *

UNITED STATES PATENT AND TRADEMARK OFFICE
CERTIFICATE OF CORRECTION

PATENT NO. : 5,181,178
DATED : JANUARY 19, 1993
INVENTOR(S) : Takao SASAKI et al.

It is certified that error appears in the above-identified patent and that said Letters Patent is hereby corrected as shown below:

TITLE PAGE [87] line 2, "Jul. 9, 1990" should be
--Sept. 7, 1990--.

TITLE PAGE [57] ABSTRACT, line 2, "spindless" should be
--spindles--.

Col. 1, line 8, "a" (first occurrence) should be
deleted.

Signed and Sealed this

Twenty-third Day of November, 1993

Attest:

BRUCE LEHMAN

Attesting Officer

Commissioner of Patents and Trademarks